Feb. 24, 1953 H. L. PEEK 2,629,462
HYDRAULIC SHOCK ABSORBER
Filed May 6, 1948

Inventor
Henry L. Peek
by Didier Journeaux
Attorney

Patented Feb. 24, 1953

2,629,462

UNITED STATES PATENT OFFICE 2,629,462

HYDRAULIC SHOCK ABSORBER

Henry L. Peek, Boston, Mass., assignor to Allis-Chalmers Manufacturing Company, Milwaukee, Wis., a corporation of Delaware Application May 6, 1948, Serial No. 25,465

5 Claims. (Cl. 188—96)

This invention relates to hydraulic shock absorbers, and more particularly to hydraulic shock absorbers for use on oil circuit breakers.

Hydraulic shock absorbers comprise a cylinder piston pump adapted to be actuated by the impact upon it of a moving system intended to be arrested. This pump, upon being so actuated, drives a suitable liquid such as, for instance, oil, through an orifice of given size. That flow of liquid through an orifice results in dissipation of the kinetic energy inherent in the moving system, whereby the system is being arrested.

If the size of the orifice is relatively small, the impact upon, and the initial pressure within, the shock absorber tend to be large, and this may cause the moving system to bounce back, to become damaged, or both. If, on the other hand, the size of the orifice is relatively large, the amount of dissipation of kinetic energy tends to be small during the stroke of the cylinder piston pump, and in that case the moving system may be subject to a final blow which may cause it to bounce back, to become damaged, or both. For these reasons hydraulic shock absorbers having a constant area orifice for the escape of liquid are extremely critical.

It is possible to greatly improve the operating characteristics of hydraulic shock absorbers by providing such shock absorbers with means for progressively decreasing the size of the orifice during the shock absorbing or arresting process. The energy dissipating characteristics of a hydraulic shock absorber having an orifice of variable size are determined by the original size of the orifice and the rate of size reduction during the stroke of the cylinder piston pump. In the ideal case the size of the orifice is progressively reduced in such a way that the moving system is being arrested by a substantially constant force.

It is, therefore, one object of the present invention to provide an improved hydraulic shock absorber wherein the area of the orifice for the passage of liquid under the action of the cylinder piston pump is variable and decreases progressively as the stroke of that pump increases.

Another object of the present invention is to provide an improved hydraulic shock absorber wherein the progressive decrease of the area of the orifice for the passage of a fluid under the action of the cylinder piston pump is such that the moving system is being arrested by a substantially constant force opposing its motion.

Since shock absorbers of oil circuit breakers are immersed in the body of oil which fills the breaker tank, that body of oil can also be used for operating the shock absorber. For this reason hydraulic shock absorbers are the preferred kind of shock absorbers for arresting the movable systems of oil circuit breakers.

Before putting an oil circuit breaker into service it is necessary to subject it to a number of mechanical tests. It is desirable to be able to conduct these tests before the breaker tank has been filled with oil, as this allows easy access and visibility of vital parts during the course of the test. Since the shock absorbers of an oil circuit breaker are called upon to properly function and arrest the movable system during dry testing, the shock absorbers must be filled with oil during the dry testing procedure. This can be achieved by placing the shock absorbers of an oil breaker during the dry testing thereof into small oil filled auxiliary vessels. However, because of space limitation within the breaker tank, the practice of oil immersing of hydraulic shock absorbers in auxiliary vessels during dry testing has not been satisfactory.

It is, therefore, another object of the present invention to provide an improved hydraulic shock absorber for oil circuit breakers that lends itself readily to dry testing of the oil circuit breakers.

Other objects and advantages will be apparent from the following detailed description of one embodiment thereof when read in connection with the accompanying drawings, in which.

Figures 1, 2, 3, 4:
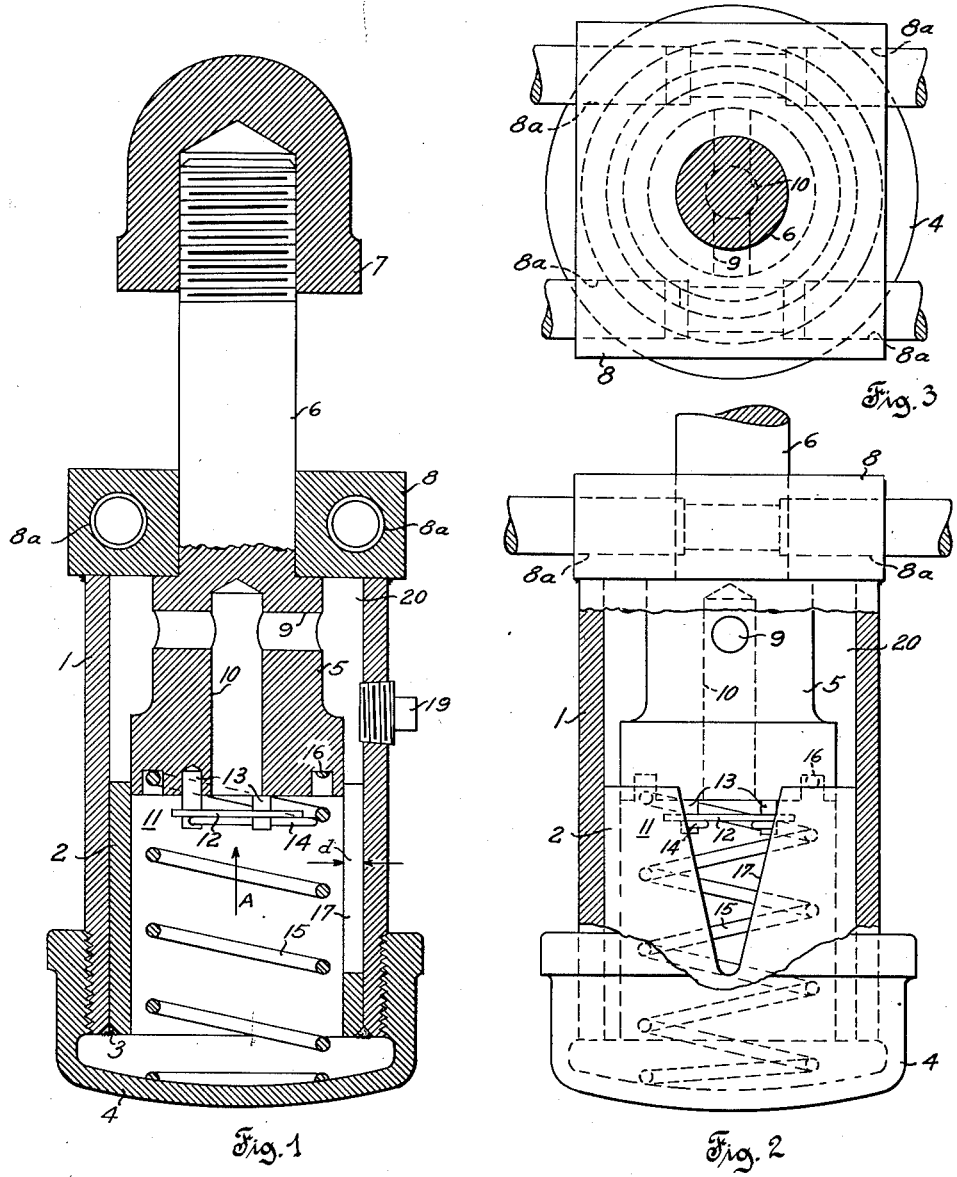
Fig. 1 is a vertical section through a hydraulic shock absorber embodying the present invention.
Fig. 2 is a view in side elevation, partly in cross section, of the shock absorber of Fig. 1.
Fig. 3 is a top plan view of the structure shown in Fig. 2.
Fig. 4 is a front view of the piston seen in the direction of the arrow A in Fig. 1.

Referring to the drawings, the reference numeral 1 designates a radially outer cylinder or housing, wherein all the other parts of the shock absorber are accommodated. The external diameter of the inner coaxial cylinder 2 is equal to the internal diameter of the outer cylinder 1, and the former is tightly fitted into the latter. Both cylinders 1 and 2 are welded together at 3 to form a structural unit. Cylinder 1 is closed by a screw cap 4. The length of cylinder 1 is about twice the length of cylinder 2, and the latter is arranged at the lower end of the former. Piston 5 is arranged in the upper portion of cylinder 1 and adapted to be pushed into cylinder 2 by means of plunger 6. The top end of plunger 6 is provided with a screw cap 7, the travel of which in a longitudinal direction is limited by the cover 8 on the outer cylinder or housing 1. Cap 7 and cover 8 thus form two cooperating stroke limiting abutments. Cover 8 is provided with four supporting holes 8a for supporting the shock absorber unit. The hydraulic shock absorber is so designed and constructed that virtually all the kinetic energy inherent in a moving system is dissipated during the travel of cap 7 toward cover 8, so that the impact of cap 7 upon cover 8, if any, will be insignificant. Piston 5 is provided with a transverse bore 9 and an axial bore 10 which define a fluid passage interconnecting the space within inner cylinder 2 with the annular space 20 formed between piston 5 and the internal surface of cylinder 1. The passage defined by bores 9 and 10 is controlled by a check valve that has been generally indicated by reference numeral 11. Check valve 11 comprises a movable valve element 12 adapted to slide along pins 13 and prevented from sliding off pins 13 by means of a tie ring 14. One end of helical spring 15 rests upon cover 4 while its opposite end bears against piston 5 and is held in position by means of a groove 16 provided in the lower surface of piston 5. Spring 15 tends to move piston 5 in an upward direction to the position shown, and when piston 5 is so moved oil or any other suitable liquid filling housing 1 is allowed to flow from the outer cylinder 1 through the passage defined by bores 9 and 10 into the inner cylinder 2. If piston 5 is moved in the opposite direction, check valve 11 blocks the passage defined by bores 9 and 10.

Inner cylinder 2 is provided with a substantially V-shaped slot or groove 17 which permits escape of fluid from the inside of cylinder 2 when piston 5 is being depressed by plunger 6. The products of the thickness d of inner cylinder 2 times the widths of slot 17 at the points thereof successively covered by piston 5 as piston 5 is moved in a downward direction within cylinder 2 determine the sizes, at different times, of the orifice by which fluid is allowed to escape from cylinder 2. It will be observed that the size of that orifice decreases as the stroke of piston 5 increases. The rate of decrease of the fluid escape area can be so calculated that piston 5 will be opposed by a substantially constant force tending to arrest its motion. This ideal arresting condition can be achieved by providing a variable fluid escape area which maintains a constant pressure level in cylinder 2 during the stroke of piston 5. Practically satisfactory arresting conditions may, however, be obtained without complying with this particular requirement. The fluid escape area may, for instance, decrease substantially linearly, and yet a reasonably uniform dissipation of kinetic energy of the moving system during the stroke of piston 5 may be achieved, resulting in substantially zero velocity close to the end of the stroke, and consequently in but a small impact, if any, of elements 7 and 8.

For reasons which will appear below, outer cylinder 1 is provided with a pipe plug 19 that is arranged slightly above the wide or upper end of V-shaped slot 17.

The operation of the shock absorber is as follows: When piston 5 is being depressed, fluid is allowed to escape from the inside of cylinder 2 through an orifice of gradually decreasing cross section. That orifice is defined by the lower edge of piston 5, the internal surface of cylinder 1 and the lateral bounding surfaces of slot 17. Fluid escapes from cylinder 2 in a direction longitudinally of slot 17 and may flow into the empty space 20 between piston 5 and cylinder 1. Pipe plug 19 may remain in position during dry testing. If desired, plug 19 may, however, be removed during testing and the hole for plug 19 may be connected, upon removal of the plug, by means of a hose (not shown) to a remote oil storage vessel arranged in a propitious place for replenishing whatever oil may be lost during the dry testing procedure by leakage between plunger 6 and cover 8 as well as by leakage through the screw thread by which cap 4 is secured to cylinder 1. Upon completion of dry testing, pipe plug 19 may be permanently removed since housing 1 is being continually supplied with oil when immersed in an oil filled tank of an oil circuit breaker.

The outer cylinder 1 and inner cylinder 2 need not be made of two separate parts which are subsequently assembled into one structural unit; they could be constituted, if desired, of but one single member, e. g., a casting.

Although but one embodiment of the present invention has been illustrated and described, it will be apparent to those skilled in the art that various changes and modifications may be made therein without departing from the spirit of the invention or from the scope of the appended claims.

It is claimed and desired to secure by Letters Patent:

1. In a hydraulic shock absorber, an outer cylinder, a coaxial inner cylinder having an external diameter equal to the internal diameter of said outer cylinder, a piston arranged in said outer cylinder and adapted to be pushed into said inner cylinder, and slot means in said inner cylinder extending in a direction longitudinally thereof and permitting fluid to be expelled from said inner cylinder into said outer cylinder under the action of said piston, said slot means and piston defining a relatively large axial fluid escape area at one end of said inner cylinder linearly decreasing in size toward the other end of said inner cylinder.

2. In a hydraulic shock absorber, an outer cylinder, a coaxial inner cylinder securely mounted within one end of said outer cylinder and having an external diameter equal to the internal diameter of said outer cylinder, a piston arranged in said outer cylinder and adapted to be pushed into said inner cylinder, a substantially V-shaped slot means extending through the walls of said inner cylinder in a direction longitudinally thereof and arranged to expel fluid therethrough into said outer cylinder under the action of said piston, said slot means being defined by surfaces substantially normal to the walls of said inner cylinder to provide an orifice of linearly decreasing fluid escape area as said piston is pushed into said inner cylinder.

3. In a hydraulic shock absorber, an outer cylinder, a coaxial inner cylinder securely mounted within one end of said outer cylinder and having an external diameter equal to the internal diameter of said outer cylinder, a piston arranged in said outer cylinder and adapted to be pushed into said inner cylinder, substantially V-shaped slot means extending longitudinally through the walls of said inner cylinder and arranged to expel fluid therethrough into said outer cylinder under the action of said piston, said slot means defined by a pair of intersecting plane surfaces substantially normal to the walls thereof to provide a linearly decreasing fluid escape orifice, the line of intersection of said plane surfaces being perpendicular to the axis of said cylinders at the end of said inner cylinder remote from the center of the shock absorber.

4. In a hydraulic shock absorber, an outer cylinder, a coaxial inner cylinder securely mounted within one end of said outer cylinder and having an external diameter equal to the internal diameter of said outer cylinder, a piston arranged in said outer cylinder and adapted to be pushed into said inner cylinder, slot means extending through the walls of said inner cylinder in a direction longitudinally thereof and arranged to expel fluid therethrough into said outer cylinder under the action of said piston, said slot means defined by a pair of plane surfaces substantially normal to the walls thereof to provide a fluid escape orifice of linearly decreasing fluid escape area which provides a substantially constant braking force, the size of said orifice being determined by the product of the thickness of said inner cylinder times the width of said orifice at points thereof successively covered by said piston as said piston moves from said outer cylinder into said inner cylinder.

5. In a hydraulic shock absorber, an outer cylinder, a coaxial inner cylinder of relatively shorter length having walls of predetermined thickness, said inner cylinder securely mounted within one end of said outer cylinder and having an external diameter equal to the internal diameter of said outer cylinder, a piston in said outer cylinder having a sliding fit in said inner cylinder, means for moving said piston from said outer cylinder into said inner cylinder, slot means in said inner cylinder permitting said piston to expel fluid from said inner cylinder into said outer cylinder in a direction longitudinally of said slot means, said slot means defining an orifice of linearly decreasing fluid escape area which provides a substantially constant braking force, the size of said orifice being determined by the product of the thickness of said inner cylinder times the width of said slot means at the points thereof successively covered by said piston as said piston is moved from said outer cylinder into said inner cylinder.

HENRY L. PEEK.

REFERENCES CITED

The following references are of record in the file of this patent:

UNITED STATES PATENTS

| Number | Name | Date |
|---|---|---|
| 1,112,705 | Kinkaid | Oct. 6, 1914 |
| 1,384,970 | Rudy | July 19, 1921 |
| 1,548,773 | Ziebarth | Aug. 4, 1925 |
| 1,821,787 | Black | Sept. 1, 1931 |
| 2,003,399 | Tamsitt | June 4, 1935 |
| 2,034,573 | Goehring | Mar. 17, 1936 |

FOREIGN PATENTS

| Number | Country | Date |
|---|---|---|
| 7,087 | France | Mar. 12, 1907 |